US012511967B2

(12) United States Patent
Enomoto

(10) Patent No.: US 12,511,967 B2
(45) Date of Patent: Dec. 30, 2025

(54) COIN CONVEYANCE DEVICE AND COIN HOPPER

(71) Applicant: Asahi Seiko Co., Ltd, Tokyo (JP)

(72) Inventor: Minoru Enomoto, Saitama (JP)

(73) Assignee: ASAHI SEIKO CO., LTD, Tokyo (JP)

( * ) Notice: Subject to any disclaimer, the term of this patent is extended or adjusted under 35 U.S.C. 154(b) by 673 days.

(21) Appl. No.: 17/902,172

(22) Filed: Sep. 2, 2022

(65) Prior Publication Data

US 2023/0074919 A1 Mar. 9, 2023

(30) Foreign Application Priority Data

Sep. 8, 2021 (JP) ................................ 2021-146206

(51) Int. Cl.
*G07D 1/00* (2006.01)

(52) U.S. Cl.
CPC ........... *G07D 1/00* (2013.01); *G07D 2201/00* (2013.01)

(58) Field of Classification Search
CPC ....... G07D 1/00; G07D 2201/00; G07D 9/008
See application file for complete search history.

(56) References Cited

U.S. PATENT DOCUMENTS

2012/0145741 A1* 6/2012 Enomoto ................ G07F 11/34 221/277
2016/0364933 A1* 12/2016 Enomoto ............... G07D 9/008

FOREIGN PATENT DOCUMENTS

| | | | | |
|---|---|---|---|---|
| CN | 102682510 A * | 9/2012 | ............ G07D 3/128 |
| EP | 2463217 | 6/2012 | |
| JP | 2009018152 A * | 1/2009 | |
| JP | 2018-132816 | 8/2018 | |
| JP | 6623372 B2 | 12/2019 | |
| WO | WO-2007048341 A1 * | 5/2007 | .............. G07D 3/06 |

OTHER PUBLICATIONS

Extended European Search Report Issued in Corresponding EP Patent Application No. 22191342.9, dated Jan. 23, 2023.

* cited by examiner

*Primary Examiner* — Kevin T Bates
*Assistant Examiner* — Poonam Sharma
(74) *Attorney, Agent, or Firm* — Greenblum & Bernstein, P.L.C.

(57) ABSTRACT

A coin conveyance device that feeds multiple coins stored in a storage container one by one and conveys the fed coin upward uses rotating bodies including pushing bodies for pushing a coin. The pushing bodies which are arranged opposed to each other about the center of rotation of each rotating body each include: a metallic pin that comes into contact with a coin; and a resin-made support protrusion that supports the pin. The support protrusion includes a concave portion corresponding to the shape of the circumferential surface of the pin. The pin is inserted into a pin hole adjacent to the support protrusion, and its side surface is supported by the concave portion of the support protrusion. A force applied when the pin pushes the coin is received by the support protrusion, whereby the durability of the pushing body is improved.

8 Claims, 11 Drawing Sheets

COIN CONVEYANCE DEVICE AND COIN HOPPER

BACKGROUND OF THE INVENTION

1. Field of the Invention

The present invention relates to a coin conveyance device that conveys coins upward one by one and a coin hopper equipped with the coin conveyance device.

2. Description of the Related Art

Coin conveyance devices are known which separate coins stored in a container from each other and convey them one by one. For example, a disc body conveyance device described in Japanese Patent No. 6623372 is equipped with a conveyance device that separates coins stored in a container from each other one by one and then conveys them upward from a lower side.

In a conveyance passage, multiple rotating bodies each including pushing bodies are arranged in rows alternately in the up-down direction while the arrangement positions of their rotational shafts change from left to right and vice versa. The pushing bodies are arranged on the circumference of each rotating body so as to be opposed to each other about the center of rotation. The pushing bodies come into contact with the circumferential surface of a coin, whose movement direction is guided by sidewalls forming the conveyance passage, and push the coin upward from a lower side along with the rotation of the rotating body. The rotating bodies arranged alternately in the up-down direction feed a coin in such a way that one of the rotating bodies receives a coin from the rotating body disposed diagonally below and transfers the coin to the rotating body disposed diagonally above. The disc body conveyance device transfers coins from the lower pushing bodies to the upper pushing bodies in turn by driving the rotating bodies arranged in rows in conjunction with each other.

Resin-made pushing bodies have heretofore had such a problem that the pushing bodies wear by coming into contact with coins. Existing techniques disclose an example where a front end portion of an arc-shaped pushing body to come into contact with a coin is made by a metallic round bar and an example where a pushing body is covered with sheet metal. However, such existing techniques are implemented by simply securing the metallic round bar or sheet metal on the rotating body firmly and making them into one unit so that the metallic round bar or sheet metal may not be detached from the rotating body. Accordingly, in the existing techniques, two kinds of rotating bodies for right-handed and left-handed rotations need to be prepared. In addition, in order to deal with a coin to be lifted up from a conveyance surface of the curved conveyance passage, the pushing bodies of the rotating body used in the curved portion need to have a larger amount of protrusion than the pushing bodies of the rotating body arranged on the flat conveyance passage. Thus, different kinds of rotating bodies are needed depending on the position of the conveyance passage, which causes problems that the number of components increases and that rotating bodies might be arranged erroneously during assembling because different kinds of rotating bodies are selectively arranged. Further, although disclosing the example where a front end portion of a pushing body is made by a metallic round bar and the example where a pushing body is covered with sheet metal, the existing techniques disclose no specific mechanisms. Against such a background, a rotating body equipped with pushing bodies having a suitable mechanism has been requested, and a coin conveyance device which has high durability and which is easy to assemble has been requested.

SUMMARY OF THE INVENTION

A coin hopper of the present invention is one which has: a storage container that stores a coin; a conveyer that conveys the coin to an outlet port disposed above the storage container; and a disc that includes a holder for holding the coin, in which the disc causes the holder to hold the coin stored in the storage container one by one to transfer the held coin to the conveyer, and the conveyer has multiple rotating bodies each including pushing bodies that are arranged opposed to each other about a rotational shaft and configured to push the coin, the adjacent rotating bodies are arranged in a direction from low to high alternately in such a way that one of the rotating bodies is located diagonally above the other rotating body, the rotating bodies rotate in conjunction with each other to convey the coin upward from the lower side in such a way that, in response to the rotation of one of the rotating bodies, the pushing bodies thereof push the coin upward from a lower side to transfer the coin to the next rack rotating body, the coin hopper being characterized in that the pushing bodies each have: a pin that comes into contact with the coin; and a support protrusion that supports the pin, the pin has: a large diameter portion that comes into contact with the coin; and a small diameter portion that is fitted into a pin hole provided in each of the rotating bodies, the support protrusion is disposed at an edge of a support surface of each of the rotating bodies, on which to support the coin, in such a way that the support protrusion protrudes from the support surface, the support protrusion includes, on front and rear sides thereof in the rotation direction of the rotating body, concave portions each having a shape corresponding to a circumferential surface of the large diameter portion, and the pin hole is placed away from a wall surface of each of the concave portions, and the circumferential surface of the large diameter portion of the pin partially comes into contact with each of the concave portions, a step portion between the large diameter portion and the small diameter portion of the pin comes into contact with the support surface, and the small diameter portion of the pin is pivotally fitted into the pin hole.

A coin conveyance device of the present invention is one which has a conveyer that receives a coin one by one and conveys the received coin to an outlet port disposed above a location where the conveyer has received the coin, in which the conveyer has multiple rotating bodies each including pushing bodies that are arranged opposed to each other about a rotational shaft and configured to push the coin, the adjacent rotating bodies are arranged in a direction from low to high alternately in such a way that one of the rotating bodies is located diagonally above the other rotating body, the rotating bodies rotate in conjunction with each other to convey the coin upward from a lower side in such a way that, in response to the rotation of one of the rotating bodies, the pushing bodies thereof push the coin upward from the lower side to transfer the coin to the next rack rotating body, the coin conveyance device being characterized in that the pushing bodies each have: a pin that comes into contact with the coin; and a support protrusion that supports the pin, the pin has: a large diameter portion that comes into contact with the coin; and a small diameter portion that is fitted into a pin hole provided in each of the rotating bodies, the support protrusion is disposed at an edge of a support surface of each of the rotating bodies, on which to support the coin, in such a way that the support protrusion protrudes from the support surface, the support protrusion includes, on front and rear sides thereof in the rotation direction of the rotating body, concave portions each having a shape corresponding to a circumferential surface of the large diameter portion, and the pin hole is placed away from a wall surface of each of the concave portions, and the circumferential surface of the large diameter portion of the pin partially comes into contact with each of the concave portions, a step portion between the large diameter portion and the small diameter portion of the pin comes into contact with the support surface, and the small diameter portion of the pin is pivotally fitted into the pin hole.

According to the present invention, it is possible to improve the durability of the pushing bodies for pushing a coin, and provide a coin conveyance device and a coin hopper equipped with easy-to-assemble rotating bodies. According to the coin conveyance device and the coin hopper, it is possible to suitably convey a coin, transferred at a lower side, to an outlet port located above.

DESCRIPTION OF THE PREFERRED EMBODIMENT

Hereinbelow, an embodiment of the present invention is described in detail with reference to FIGS. 1 to 11. These drawings are each illustrated only schematically to the extent that the present invention can be understood sufficiently. Accordingly, the present invention is not limited to the illustrated example. In addition, in each drawing, common or similar constituents are assigned the same reference signs, and their redundant description is omitted here. For the purpose of describing an example of a coin conveyance device, a coin hopper with a coin conveyance device is described as an example. Further, coins also include disc bodies, such as medals and tokens, in addition to hard money. Furthermore, in a front view, the disc bodies may have a polygonal shape, such as an octagonal shape or dodecagonal shape, in addition to a circular shape.

Figure 1:
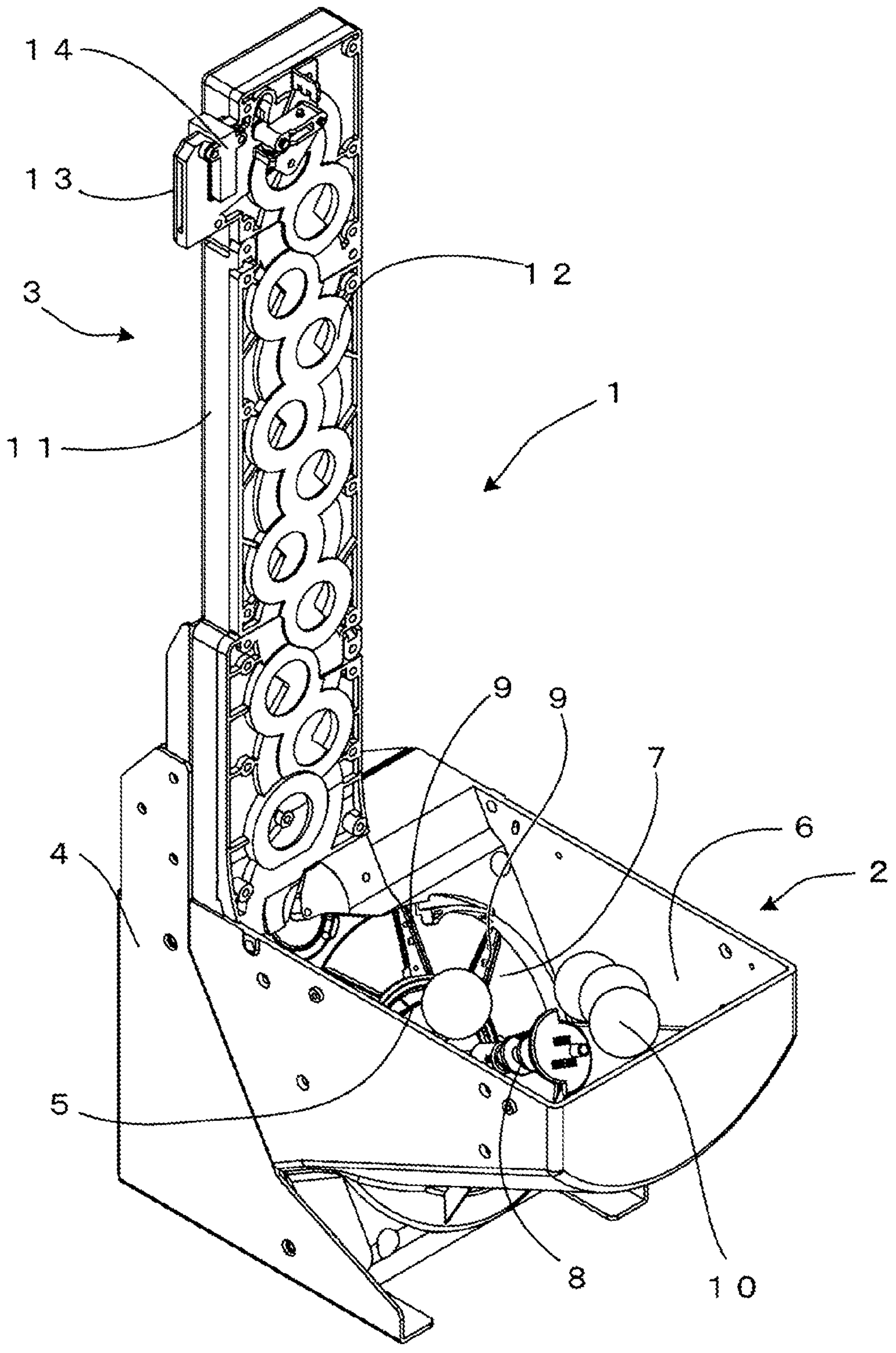
FIG. 1 is a perspective view of a coin hopper.

FIG. 1 is a perspective view of a coin hopper. A coin hopper 1 includes: a separation unit 2 that separates multiple coins 10 stored in a storage container 6 from each other one by one; and a conveyer 3 that conveys the coins 10 thus separated by the separation unit 2 one by one to an outlet port 13 disposed above the separation unit 2. The conveyer 3 is a coin conveyance device.

The separation unit 2 and the conveyer 3 are fixed on a frame 4. The frame 4 also functions as a leg unit that causes the coin hopper 1 to stand on its own. The separation unit 2 includes the storage container 6 that stores the multiple coins 10 therein. The separation unit 2 includes a disc 5 that has multiple separator bodies 9 arranged thereon. The disc 5 has an agitation rod 8 at its center of rotation. The agitation rod 8 rotates in conjunction with the rotation of the disc 5 to agitate the coins 10 stored in the storage container 6.

The disc 5 has, at positions between every two adjacent separator bodies 9, holders 7 that hold the coins 10 and each have a flat bottom surface. Each separator body 9 protrudes from the flat bottom surface of the holder 7. In response to the rotation of the disc 5, the coins 10 stored in the storage container 6 are caught by the separator bodies 9 and held in the holders 7. The amount by which each separator body 9 protrudes from the flat surface is smaller than the thickness of each coin 10 and is small enough to catch only one coin 10. One coin 10 is held in one holder 7.

The conveyer 3 has a passage for the coins 10 formed by: a passage base 11 that is disposed perpendicularly to the direction horizontal with respect to the separation unit 2; and a passage plate 12 that is disposed opposite the passage base 11. A detector 14 that detects whether any coin 10 exists is disposed near the outlet port 13. The detector 14 is a sensor that detects the coins 10 discharged. The detector 14 is connected to a control circuit (not illustrated), and the control circuit counts the number of the coins 10 discharged and identifies the types of the coins.

The coin hopper 1 is capable of discharging the coins 10 stored in the storage container 6 from the outlet port 13 one by one and detecting the coins 10 thus discharged.

The coin conveyance passage curves at a portion of connection between the separation unit 2 and the conveyer 3. The coin conveyance passage of the conveyer 3 disposed perpendicularly to the horizontal direction and the disc 5 of the separation unit 2 disposed diagonally are connected to each other via the curved conveyance passage.

Figure 2:
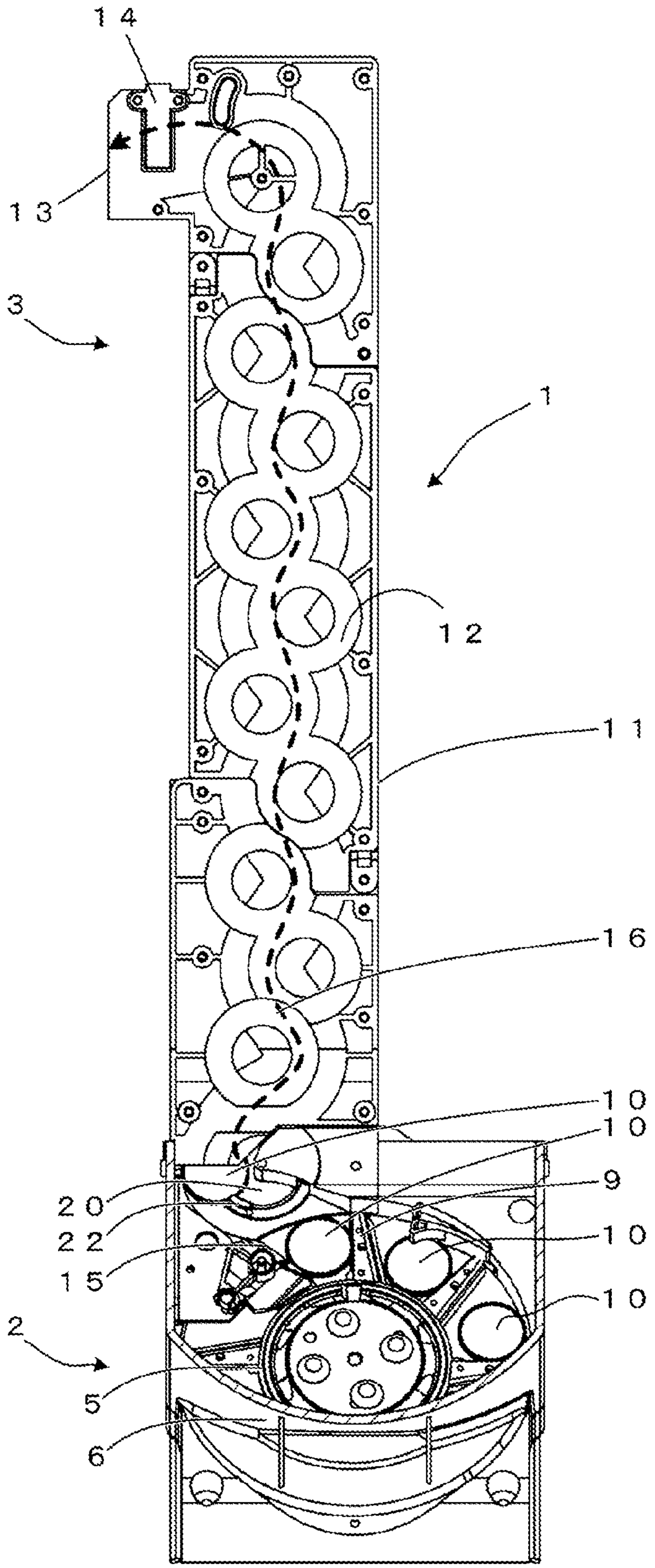
FIG. 2 is a front view of the coin hopper.

Next, the coin hopper 1 is described using FIG. 2. FIG. 2 is a front view of the coin hopper.

In response to the rotation of the disc 5, the coins 10 stored in the storage container 6 enter between every two adjacent separator bodies 9 one by one to be conveyed. The coins 10 are picked up from the storage container 6 disposed on the lower side of the disc 5 and then the coins 10 are transferred to the conveyer 3 disposed above to travel along the path 16 upward toward the outlet port 13.

A guide body 15 for changing the course of the coins 10 to the direction heading toward the entrance of the conveyer 3 is disposed on the upper side of the disc 5. After coming into contact with the guide body 15, the coins 10 are pushed by the separator bodies 9 to move in the outer circumferential direction of the disc 5 along the guide body 15. As the disc 5 rotates, the clearance between the guide body 15 and each separator body 9 becomes smaller, which pushes the coin 10 in the direction heading toward an introductory rotating body 20. The coins 10 separated by the separation unit 2 one by one are guided to the introductory rotating body 20 which is an initial rotating body of the conveyer 3.

The introductory rotating body 20 rotates in synchronization with the rotation of the disc 5. The introductory rotating body 20 includes two first pushing bodies 22. The disc 5 rotates counterclockwise while the introductory rotating body 20 rotates clockwise. Each coin 10 is carried by being caught by the first pushing bodies 22 of the introductory rotating body 20 rotating clockwise. The coins 10 are pushed by the first pushing bodies 22 of the introductory rotating body 20 to be conveyed along the conveyance passage formed between the passage base 11 and the passage plate 12.

Figure 3:
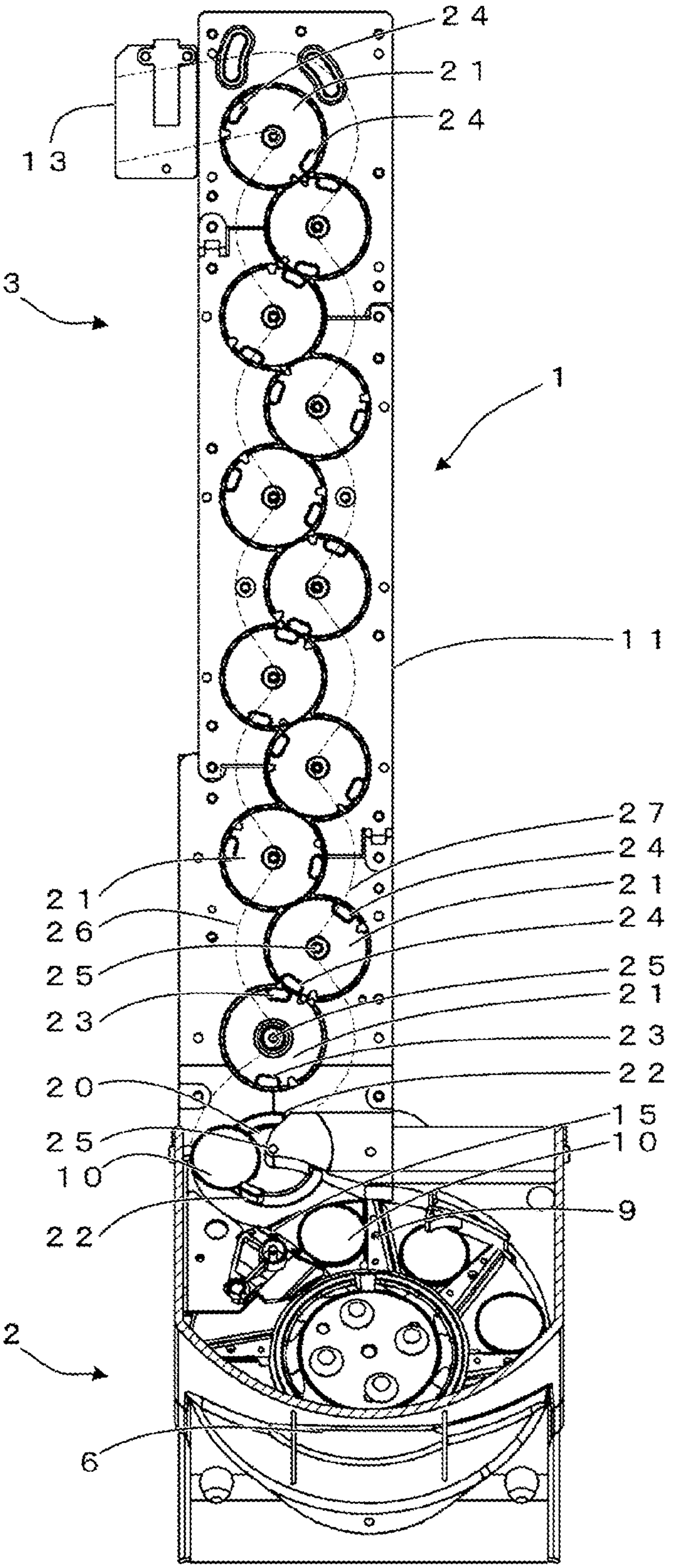
FIG. 3 is a first view explaining an example of conveying coins.
Figure 4:
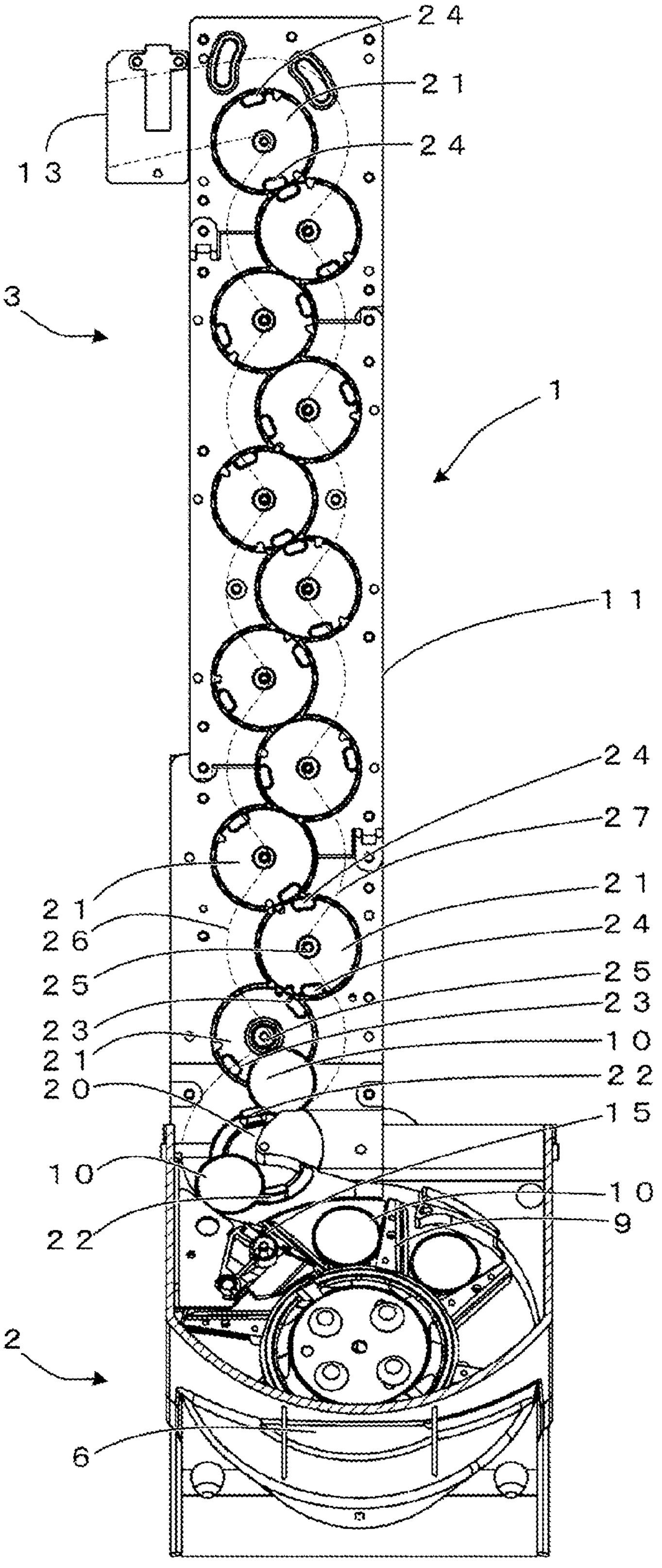
FIG. 4 is a second view explaining the example of conveying coins.
Figure 5:
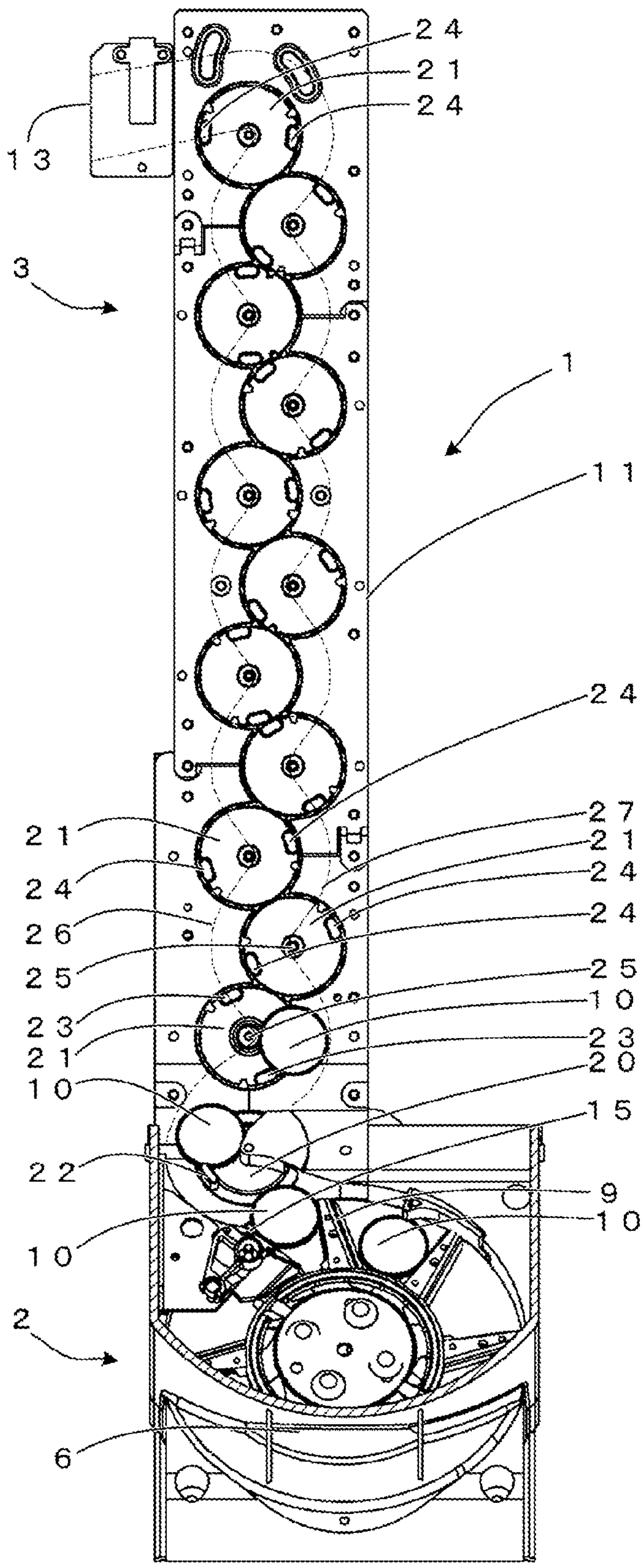
FIG. 5 is a third view explaining the example of conveying coins.
Figure 6:
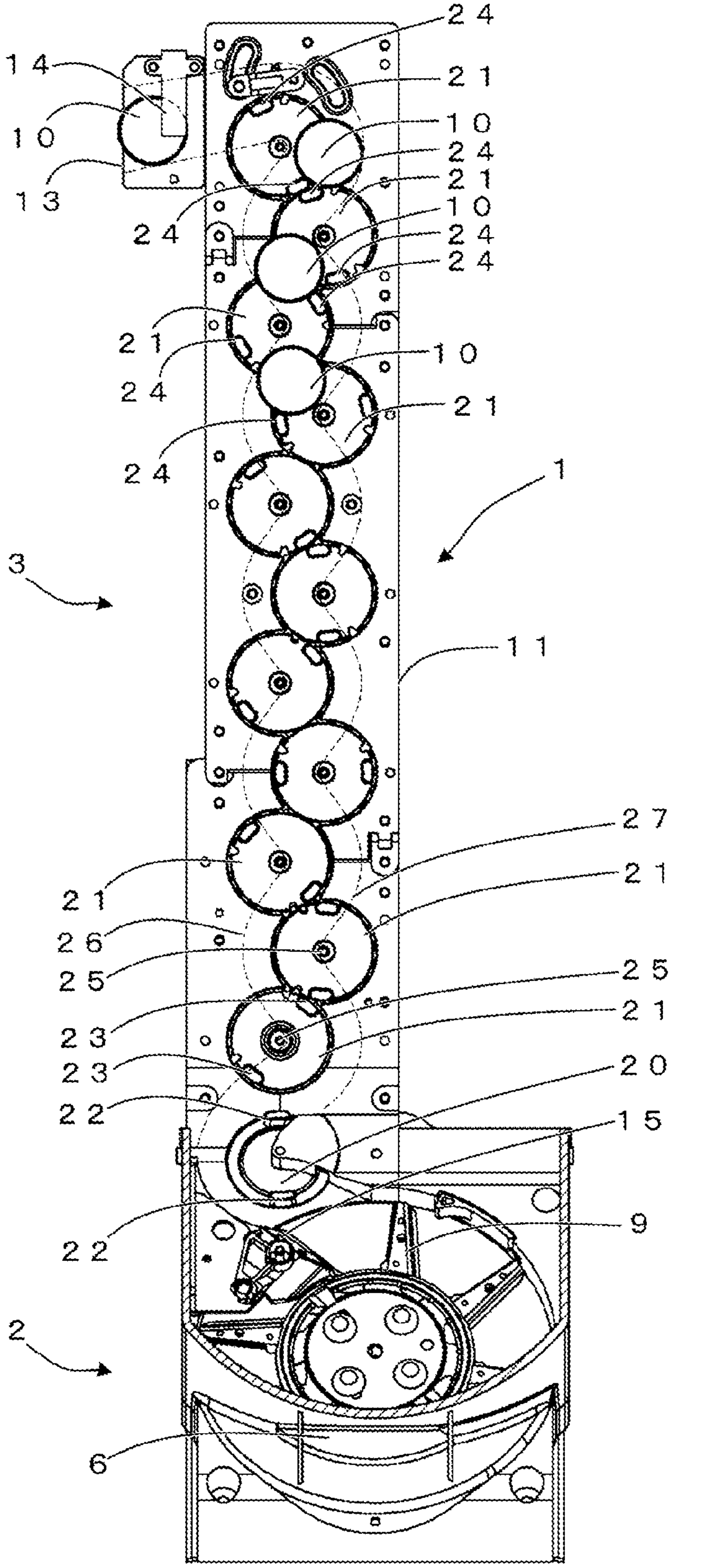
FIG. 6 is a fourth view explaining the example of conveying coins.

Next, an operation of conveying the coins 10 moving along the conveyance passage formed between the passage base 11 and the passage plate 12 is described using FIGS. 3 to 6. FIG. 3 is a first view explaining an example of conveying coins. FIG. 4 is a second view explaining the example of conveying coins. FIG. 5 is a third view explaining the example of conveying coins. FIG. 6 is a fourth view explaining the example of conveying coins. FIGS. 3 to 6 are front views of the coin hopper 1 with the passage plate 12 detached. FIG. 3, FIG. 4, FIG. 5, and FIG. 6 illustrate a process of conveying the coins 10 in this order.

A first conveyance guide 26 and a second conveyance guide 27 illustrated by broken lines are the conveyance passage for the coins 10 formed by the passage base 11 and the passage plate 12, and these guides indicate sidewall portions for guiding the circumferential surface of each coin 10. The passage base 11 includes a dent in which the coins 10 are movable, and the sidewalls of this dent constitute the first conveyance guide 26 and the second conveyance guide 27. A bottom surface of the dent is further provided with dents having substantially circular openings for the introductory rotating body 20 and conveyance rotating bodies 21 to be inserted, and the introductory rotating body 20 and the conveyance rotating bodies 21 are rotatably arranged in the dents. The bottom surface of the dent of the passage base 11, a front surface of the introductory rotating body 20, and front surfaces of the conveyance rotating bodies 21 constitute a bottom surface of the conveyance passage, and the coins 10 move on this bottom surface. Between the introductory rotating body 20 and its adjacent conveyance rotating body 21, a conveyance surface is provided by the passage base 11 so that no step is formed therebetween.

The introductory rotating body 20 is disposed at the curved portion of the passage for the coins 10. The surface of the introductory rotating body 20 on which to place the coin is disposed diagonally with respect to the horizontal direction. The introductory rotating body 20 receives the coin 10 from the diagonally disposed disc 5, and transfers this coin to the undermost conveyance rotating body 21 whose surface, on which to place the coin 10, is disposed perpendicularly to the horizontal direction. In this portion of the conveyance passage, the posture of the coin 10 being conveyed gradually changes from the posture at an inclination angle equal to that of the disc 5 to the posture parallel with the vertical direction, and the introductory rotating body 20 is disposed in the middle of this portion. The surface of the introductory rotating body 20 on which to place the coin 10 cannot be curved and is thus a flat surface. In this curved conveyance passage, the coin 10 is sometimes lifted up from the coin placement surface partially when moving from the introductory rotating body 20 to the conveyance rotating body 21.

The portion of the conveyance passage for the coins 10 perpendicular to the horizontal direction supports the front or rear surface of each coin 10 by the conveyance rotating bodies 21 and the passage base 11 which are formed to be approximately flush with each other. In addition, the passage plate 12 covers the conveyance passage for the coins 10 in order to prevent the coins 10 being conveyed from dropping off.

The introductory rotating body 20 and the conveyance rotating bodies 21 are each rotatably mounted on the passage base 11 with a rotational shaft 25 as its axis. The disc 5, the introductory rotating body 20, and the conveyance rotating bodies 21 rotate in conjunction with each other. The rotational shafts of the conveyance rotating bodies 21 are arranged alternately on two straight lines extending parallel with each other. At a position diagonally right above or diagonally left above the conveyance rotating body 21, the next rack conveyance rotating body 21 is arranged. The conveyance rotating bodies 21 are arranged zigzag to form the conveyance passage for conveying the coins 10 in a meandering fashion.

The coin hopper 1 transfers the coins 10 one by one from the separation unit 2 to the conveyer 3. In addition, the conveyer 3 conveys the coins 10 to and discharges them from the outlet port 13 one by one.

The surfaces of the holders 7 and the introductory rotating body 20 on which to place the coins are set to be flush with each other. In the separation unit 2, the coins 10 enter between every two adjacent separator bodies 9 one by one, are then pushed by the separator bodies 9 to change their conveyance direction to the direction heading toward the introductory rotating body 20 along the guide body 15, and then lastly transferred to the introductory rotating body 20. The coins 10 transferred to the introductory rotating body 20 are pushed and conveyed upward by the first pushing bodies 22 of the introductory rotating body 20.

The introductory rotating body 20 rotates clockwise about the rotational shaft 25. The two first pushing bodies 22 are arranged on the outer circumferential edge of the introductory rotating body 20 about the rotational shaft 25. The conveyance rotating body 21 which is the second rack rotating body is arranged immediately above the introductory rotating body 20. On the second rack conveyance rotating body 21, two second pushing bodies 23 are arranged in the same manner. On each of the third to last rack conveyance rotating bodies 21, two third pushing bodies 24 are arranged in the same manner. The difference between the second pushing bodies 23 and the third pushing bodies 24 is the height of a pin to be described later. The height of the pin of each of the second pushing bodies 23 is higher than that of each of the third pushing bodies 24. The second rack conveyance rotating body 21 rotates counterclockwise which is opposite to the rotation direction of the introductory rotating body 20, and the third rack conveyance rotating body 21 rotates clockwise. Their rotation direction switches alternately. The curved conveyance surface formed by the passage base 11 is disposed between the introductory rotating body 20 and the second rack conveyance rotating body 21. The introductory rotating body 20 and the conveyance rotating body 21 are placed away from each other in order to make the heights of the first pushing bodies 22 and the second pushing bodies 23 as small as possible, which reduces the amount by which the coin 10 is lifted up from the conveyance surface.

Once the first pushing bodies 22 of the introductory rotating body 20 arrive at the highest point in the direction perpendicular to the horizontal direction, the second pushing bodies 23 of the second rack conveyance rotating body 21 start pushing the coin 10 from the left side so as to pick up the coin 10 (see FIG. 4). The introductory rotating body 20 rotates clockwise while the second rack conveyance rotating body 21 rotates counterclockwise, and they rotate in conjunction with each other.

The second pushing bodies 23 of the second rack conveyance rotating body 21 rotate counterclockwise to push the coin 10 up (see FIG. 5).

The coin 10 is conveyed while being pushed up by the conveyance rotating bodies 21 in order from lowest to highest. Then, after being transferred to the last rack conveyance rotating body 21, the coin 10 is pushed by the third pushing bodies 24 to move along the conveyance passage until it is discharged from the outlet port 13. The passage from the last rack conveyance rotating body 21 to the outlet port 13 inclines downward, whereby the coin 10 rolls down by gravity (see FIG. 6). The detector 14 detects whether there is any coin 10 passing through the conveyance passage.

Figure 7:
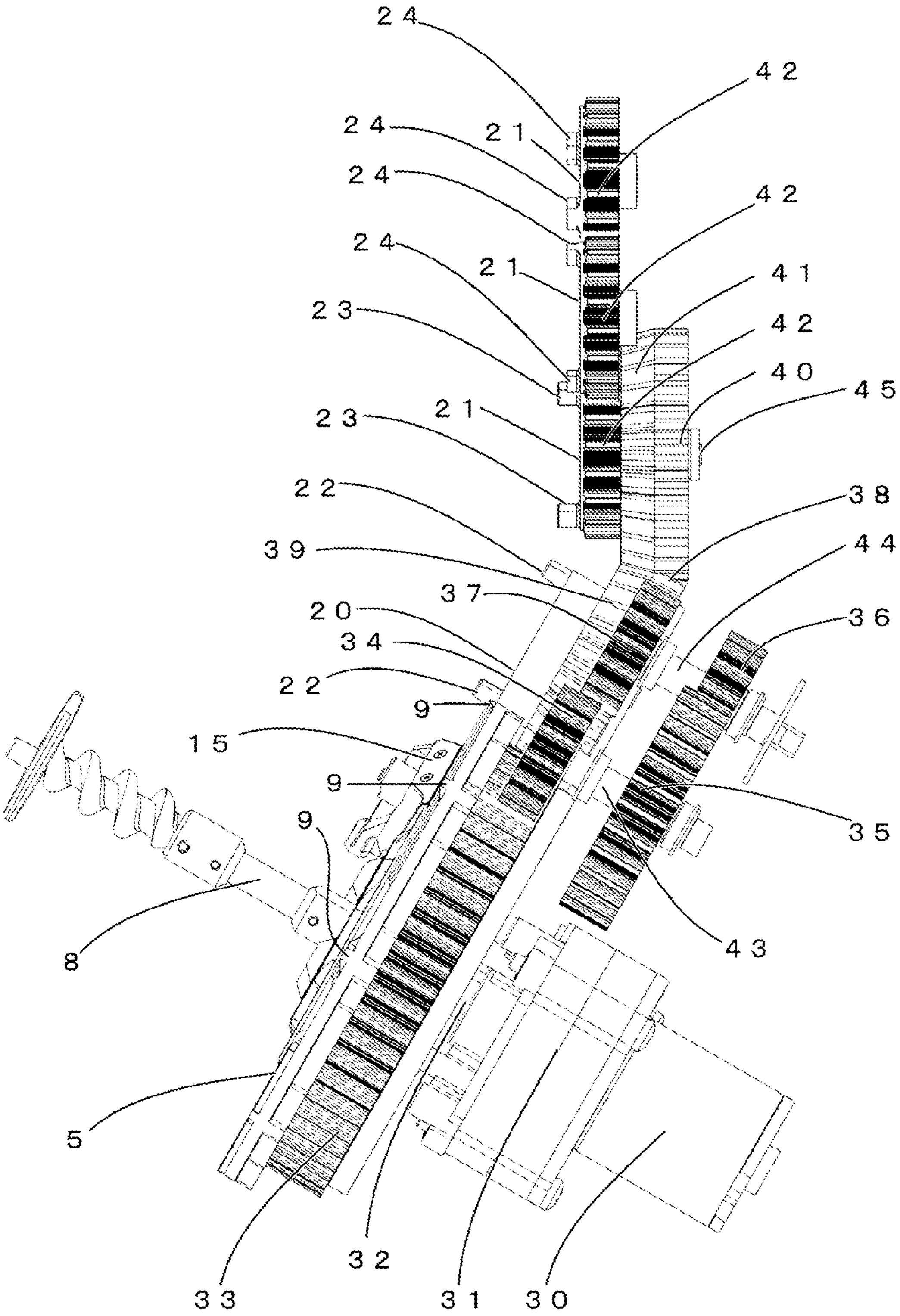
FIG. 7 is a view explaining a drive unit for conveying coins.

Next, the driving of each rotating body in the conveyance passage is described. FIG. 7 is a view explaining a drive unit for conveying coins.

The disc 5, the introductory rotating body 20, and the conveyance rotating bodies 21 are driven by a motor 30. The disc 5, the introductory rotating body 20, the conveyance rotating bodies 21, and the motor 30 are coupled to each other by gears.

A deceleration unit 31 is connected to the motor 30. The deceleration unit 31 is connected to a rotational shaft 32 of the disc 5 and configured to decelerate the number of revolutions of the motor 30 to a predetermined number of revolutions. For example, the deceleration unit 31 sets the number of revolutions of the disc 5 at 100 revolutions per minute. The disc 5 and the agitation rod 8 are connected to the rotational shaft 32 of the disc 5. The disc 5 includes a first gear 33.

A second gear 34 and a third gear 35 are secured on a first coupling shaft 43. The second gear 34 and the third gear 35 work in conjunction with each other. The second gear 34 and the first gear 33 mesh with each other. The third gear 35 works in conjunction with the first gear 33 via the second gear 34 and the first coupling shaft 43.

A fourth gear 36 and a fifth gear 37 are secured on a second coupling shaft 44. The fourth gear 36 and the fifth gear 37 work in conjunction with each other. The fourth gear 36 and the third gear 35 mesh with each other. The fifth gear 37 works in conjunction with the third gear 35 via the fourth gear 36 and the second coupling shaft 44.

The introductory rotating body 20 includes a first bevel gear 39 on the opposite side thereof from the surface on which to place the coin 10, and the first bevel gear 39 includes a first spur gear 38. The introductory rotating body 20 is a rotating body including the first pushing bodies 22, the first bevel gear 39, and the first spur gear 38. The fifth gear 37 and the first spur gear 38 mesh with each other. The introductory rotating body 20 works in conjunction with the rotation of the fifth gear 37. The first bevel gear 39 and the first spur gear 38 may be formed integrally.

The conveyance rotating body 21 next to the introductory rotating body 20 includes a conveyance gear 42 on the circumferential surface thereof, a second bevel gear 41 is secured on the surface thereof on the opposite side from the surface on which to place the coin 10, and a second spur gear 40 is secured on the second bevel gear 41. The conveyance rotating body 21 next to the introductory rotating body 20 is rotatably supported on a third coupling shaft 45 together with the second bevel gear 41 and the second spur gear 40.

The conveyance rotating body 21 next to the introductory rotating body 20 is a rotating body which includes the conveyance gear 42 and the second pushing bodies 23 and on which the second bevel gear 41 and the second spur gear 40 are secured. The first bevel gear 39 and the second bevel gear 41 mesh with each other. The conveyance rotating body 21 next to the introductory rotating body 20 works in conjunction with the rotation of the introductory rotating body 20. The second bevel gear 41 and the second spur gear 40 may be formed integrally, or may be used with the same shape as the first bevel gear 39 and the first spur gear 38 with the deceleration ratio set to 1:1. In addition, the introductory rotating body 20 and the conveyance rotating body 21 are placed away from each other. The heights of the first pushing bodies 22 and the second pushing bodies 23 are determined according to the distance between the two rotating bodies and the cone angles of the first bevel gear 39 and the second bevel gear 41. In the case of changing the curve angle of the conveyance passage, it is possible to deal with this change easily by changing the cone angles of the first bevel gear 39 and the second bevel gear 41 and the height of each pin 53 to be described later.

The third rack conveyance rotating body 21 includes the third pushing bodies 24 and the conveyance gear 42 on the circumferential surface thereof. The conveyance gear 42 of the second rack conveyance rotating body 21 and the conveyance gear 42 of the third rack conveyance rotating body 21 mesh with each other. The third rack conveyance rotating body 21 works in conjunction with the rotation of the second rack conveyance rotating body 21. The fourth or later rack conveyance rotating body 21 also includes the conveyance gear 42, and the previous and next conveyance gears 42 mesh with each other and work in conjunction with each other. The rotation directions of the introductory rotating body 20 to the last rack conveyance rotating body 21 are reversed alternately. The motor 30 drives the disc 5, the introductory rotating body 20, and the conveyance rotating bodies 21. Since each of the gears ranging from the first gear 33 to the second bevel gear 41 is set suitably, the disc 5, the introductory rotating body 20, and the conveyance rotating bodies 21 rotate in synchronization with each other.

In order to deal with the curved conveyance passage for the coins 10, extension lines from the surfaces of the introductory rotating body 20 and the second rack conveyance rotating body 21, on which to place the coin 10, intersect with each other. The coin 10 is partially lifted up from the coin placement surface in this section. For this reason, the amount by which each of the first pushing bodies 22 and the second pushing bodies 23 protrudes from the coin placement surface is larger than that of the third pushing bodies 24. The first pushing bodies 22 and the second pushing bodies 23 are set so as to suitably come into contact with and push the circumferential surface of the coin 10 even if the coin 10 is lifted up. The surfaces of the disc 5 and the introductory rotating body 20, on which to place the coin 10, are set to be substantially flush with each other. The second rack conveyance rotating body 21 and the third or later rack conveyance rotating body 21 differ in terms of the heights of the second pushing bodies 23 and the third pushing bodies 24. The second rack conveyance rotating body 21 has the same shape as other conveyance rotating bodies except the height of the pushing bodies.

Next, each conveyance rotating body 21 is described using FIGS. 8 to 11.

Figure 8:
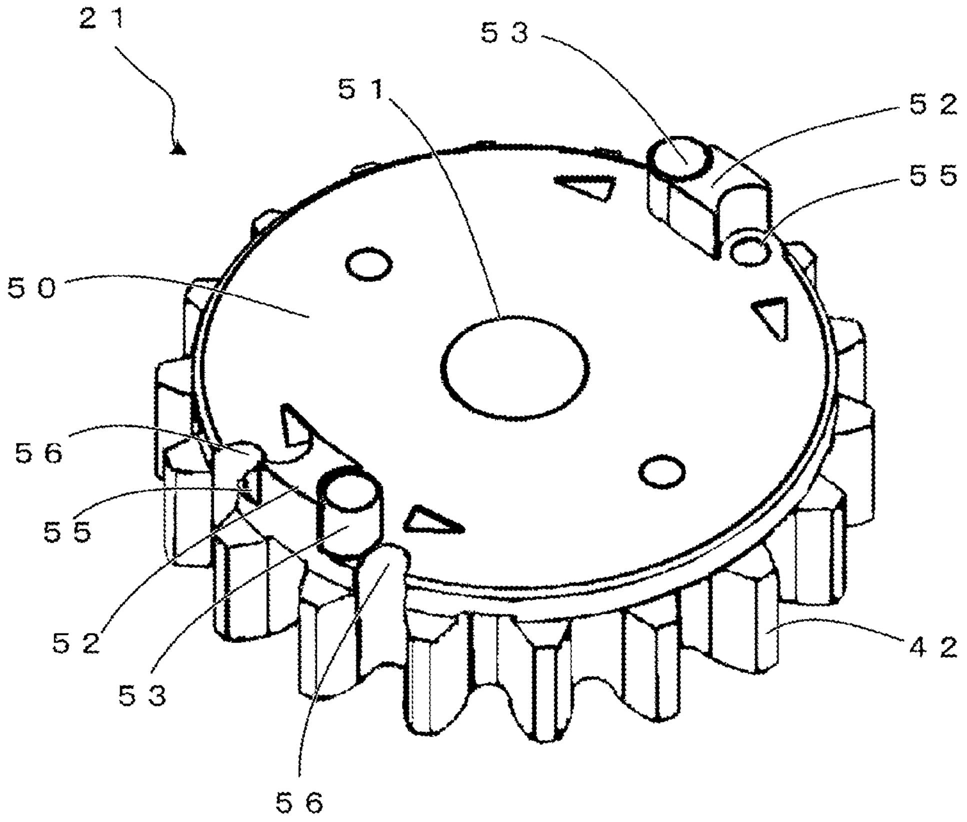
FIG. 8 is a perspective view of a rotating body.
Figure 9:
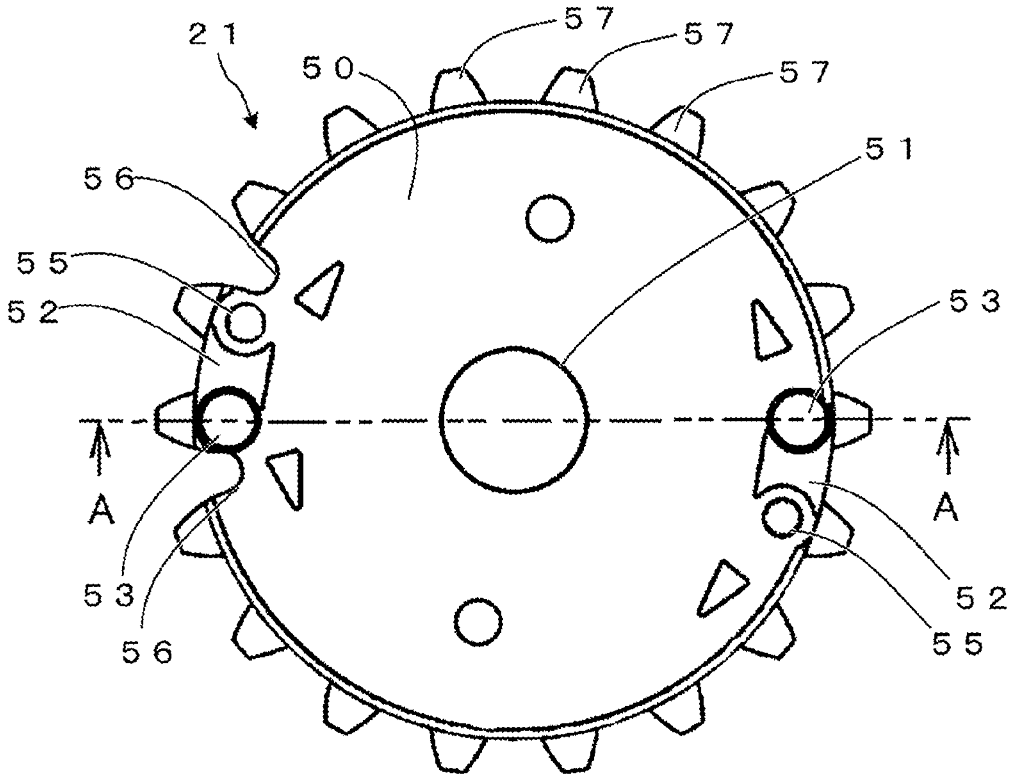
FIG. 9 is a front view of the rotating body.
Figure 10:
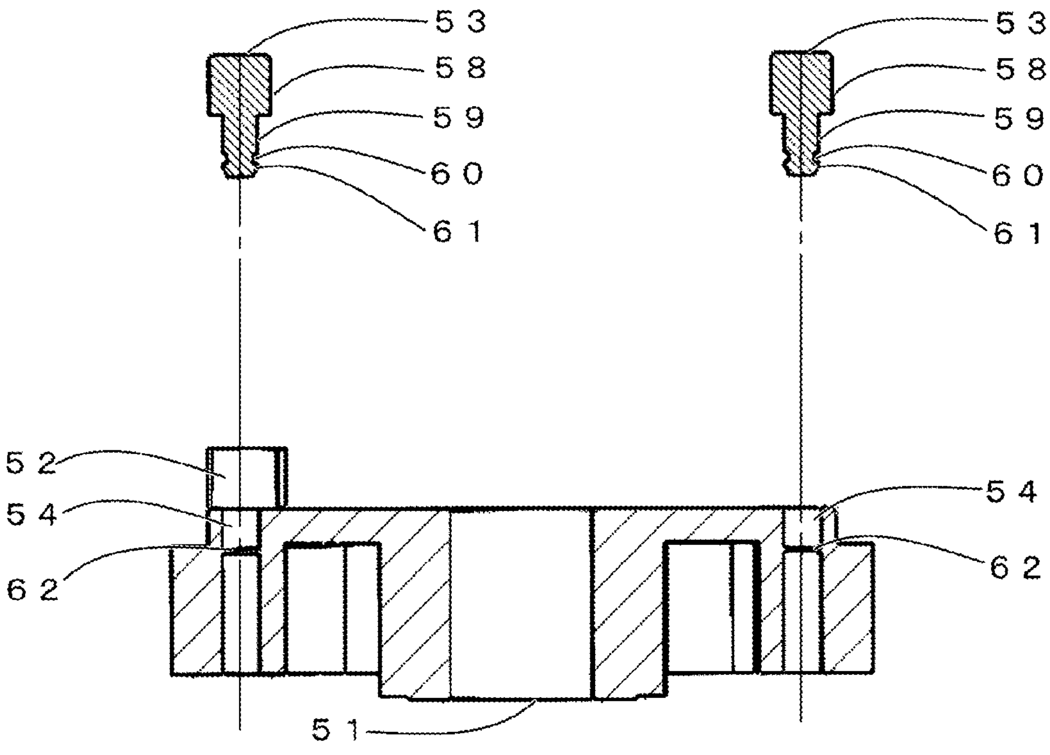
FIG. 10 is a first sectional view of the rotating body.
Figure 11:
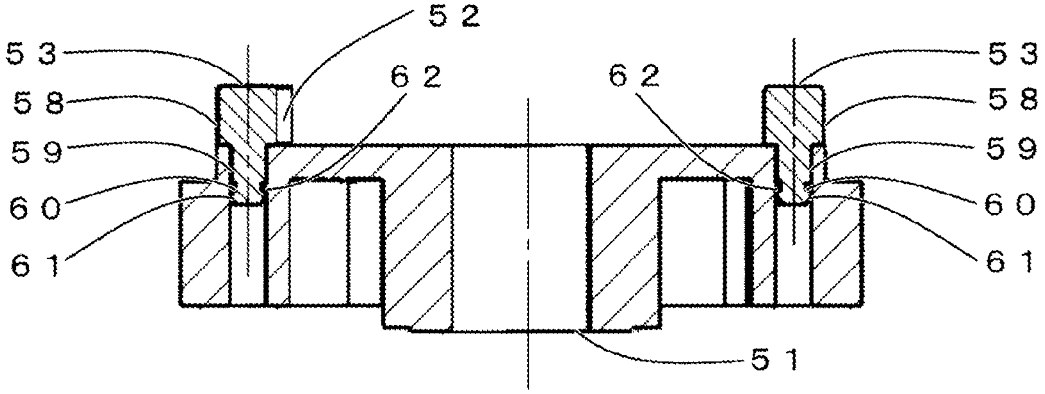
FIG. 11 is a second sectional view of the rotating body.

Its appearance is described using FIGS. 8 and 9. FIG. 8 is a perspective view of the rotating body. FIG. 9 is a front view of the rotating body. Sectional views taken along a chain double-dashed line A-A of FIG. 9 are illustrated in FIGS. 10 and 11. FIG. 10 is a first sectional view of the rotating body. FIG. 11 is a second sectional view of the rotating body. FIG. 10 is a view illustrating a state before the pins 53 are fitted, while FIG. 11 is a view illustrating a state where the pins 53 are fitted.

A shaft hole 51 is disposed at the center of the conveyance rotating body 21. The rotational shaft is inserted into and secured in the shaft hole 51 of the conveyance rotating body 21. The rotational shaft secured in the shaft hole 51 serves as the center of rotation. The conveyance rotating body 21 includes the conveyance gear 42 on the circumferential surface thereof. One surface of the conveyance rotating body 21 is a coin placement surface 50 on which to place the coin 10. A pair of support protrusions 52 are arranged on the conveyance rotating body 21 at edges thereof opposed to each other about the center of rotation, in such a way that the support protrusions protrude from the coin placement surface 50. A first pin hole 54 and a second pin hole 55 for allowing the pin 53 to be fitted thereinto are provided at front and rear sides of each support protrusion 52 in the rotation direction of the conveyance rotating body 21. The first pin hole 54 and the second pin hole 55 are placed away from the support protrusion 52. The pin 53 and the support protrusion 52 constitutes the pushing body for pushing the coin 10. A pair of the pins 53 are opposed to each other about the center of rotation of the conveyance rotating body 21. Likewise, a pair of the second pin holes 55 are opposed to each other about the center of rotation of the conveyance rotating body 21. The coin placement surface 50 of the conveyance rotating body 21 is a flat support surface for supporting the coin 10 being conveyed.

The pins 53 are inserted into any one of or both of the first pin holes 54 and the second pin holes 55. The conveyance rotating body 21 with the pins 53 fitted into the first pin holes 54 is applicable to the conveyance rotating bodies 21 placed at positions where they rotate counterclockwise. The conveyance rotating body 21 with the pins 53 fitted into the second pin holes 55 is applicable to the conveyance rotating bodies 21 placed at positions where they rotate clockwise. The conveyance rotating body 21 with the pins 53 fitted into both holes is applicable to the conveyance rotating bodies 21 rotating in both rotation directions, whereby the conveyer 3 can be assembled without selectively arranging the conveyance rotating bodies. To put it differently, each conveyance rotating body 21 includes the two support protrusions 52 and the first and second pin holes 54 and 55 disposed outer side at both ends of each support protrusion 52, and the pins 53 can be fitted into all of the first and second pin holes 54 and 55. By mounting the four pins 53 in the conveyance rotating body 21, it is possible to form the conveyance rotating body 21 with no restrictions in terms of rotation direction.

Each pin 53 includes: a large diameter portion 58 that forms a side surface for coming into contact with the coin 10; and a small diameter portion 59 that is fitted into the first pin hole 54 or the second pin hole 55. The small diameter portion 59 has at its distal end side a distal end inclination portion 61 that is reduced in diameter toward the distal end direction so that the pin may be inserted into the first pin hole 54 or the second pin hole 55 easily. In addition, the pin 53 includes a ring-shaped lock concave portion 60. The first pin hole 54 and the second pin hole 55 are through holes. The first pin hole 54 or the second pin hole 55 includes a ring-shaped lock convex portion 62 at a position corresponding to the lock concave portion 60 of the pin 53. The pin 53 is inserted and press fitted into the first pin hole 54 or the second pin hole 55 to a position where the lock convex portion 62 and the lock concave portion 60 are latched together and locked. Since the first pin hole 54 or the second pin hole 55 is a through hole, the pin 53 can be detached from the first pin hole 54 or the second pin hole 55 by pushing the distal end of the pin 53 from the other side of the pin hole.

Once inserted into the first pin hole 54, the pin 53 becomes hard to insert or extract by the lock concave portion 60 and the lock convex portion 62 fitted to each other. In addition, although resistance due to friction against the first pin hole 54 exists, the pin 53 is supported pivotally in the first pin hole 54. If applied with an unexpected force when coming into contact with the coin 10, the pin 53 can disperse this force by pivoting, which prevents breakage. Further, since the lock convex portion 62 is latched with the lock concave portion 60, the pin 53 pivots but never comes off.

Each support protrusion 52 includes an arc-shaped concave portion that corresponds to the circumferential surface of the large diameter portion 58 of the pin 53. The pin 53 is supported at the side surface of the large diameter portion 58 by the arc-shaped concave portion of the support protrusion 52. The pin 53 is preferably supported by the arc-shaped concave portion of the support protrusion 52 across an area one-fourth to half the circumferential surface of the large diameter portion 58. The support protrusion 52 can bear the force applied to the pin 53 in its rotation direction. In addition, since the surface for supporting the pin 53 has an arc shape, the support protrusion can bear, across a large area thereof, the force applied by the pin 53. The first pin hole 54 and the second pin hole 55 are preferably arranged at a proximal portion of gear teeth 57. The proximal portion of each gear tooth 57 is thick enough to allow a hole to be formed therein, but no hole can be formed between the gear teeth 57. Further, by arranging the pin 53 at a synchronous position with the gear tooth 57, it is possible to operate the conveyance rotating body 21 in conjunction with other conveyance rotating bodies of the same shape. Because the pin 53 is supported by the support protrusion 52, it is possible to prevent the small diameter portion 59 from pushing the wall surface of the first pin hole 54 or the second pin hole 55 and expanding the pin hole. Furthermore, the opening of the first pin hole 54 or the second pin hole 55 is separated from the support protrusion 52, and a step portion between the large diameter portion 58 and the small diameter portion 59 comes into close contact with this separated portion, which prevents wobbling of the pin 53. It is preferable that half to three-fourths the area of the circumferential surface of the pin 53 be in contact with the inner circumference of the first pin hole 54 or the second pin hole 55 and the support protrusion 52. By supporting a large portion of the surface of the pin 53, it is possible to ease impact on the pin 53 caused by its contact with the coin 10, and thereby prevent a failure such as wobbling of the pin.

A notch 56 is a groove that is provided next to the first pin hole 54 and the second pin hole 55 located on one side of the pair of pin holes and extends to the rear surface of the conveyance rotating body. The notch 56 is provided near the pushing body on one side and can serve as a mark used when the conveyance rotating bodies 21 mesh with each other during discrete manufacturing. In addition, since the conveyance gear 42 can be fitted into the notch 56, the conveyance rotating body 21 can be mounted from the coin 10 placement surface side.

The second rack conveyance rotating body 21 of the conveyer 3 includes the second pushing bodies 23 the amount of protrusion of which is large, and the third pushing bodies 24 of the third or later rack conveyance rotating body 21 protrude by a smaller amount than the second pushing bodies 23. The pin 53 whose large diameter portion 58 is long can be used for the second rack conveyance rotating body 21, while the pin 53 whose large diameter portion 58 is short can be used for the third or later rack conveyance rotating body 21. By using the pins 53 having the large diameter portions 58 of different lengths, it is possible to make the conveyance rotating body 21 equipped with the second pushing bodies 23 and the conveyance rotating body 21 equipped with the third pushing bodies 24 while using the same components for the rest of the assembly. Further, the pin 53 for the second pushing bodies 23 whose large diameter portion 58 is long is also applicable to the introductory rotating body 20.

The first pin hole 54 or the second pin hole 55 may be provided, at a position near the opening, with a concave portion having a very shallow depth, e.g. about 0.5 mm, into which the large diameter portion 58 can enter. By inserting an edge of the step portion between the large diameter portion 58 and the small diameter portion 59 into this concave portion, it is possible to prevent the coin 10 from being damaged because this edge portion is no longer brought into contact with the coin 10. Further, the small diameter portion 59 may be provided with very small ring-shaped concave and convex portions arranged in parallel with the lock concave portion 60, so that the pin is pivotable but hard to come off.

What is claimed is:

1. A coin hopper, comprising:

a storage container that stores a coin;

a conveyer that conveys the coin to an outlet port disposed above the storage container; and a disc that includes a holder for holding the coin, in which the disc causes the holder to hold the coin stored in the storage container one by one to transfer the coin held to the conveyer, and the conveyer has a plurality of rotating bodies each including pushing bodies that are arranged opposed to each other about a rotational shaft and configured to push the coin, adjacent rotating bodies are arranged in a direction from low to high alternately in such a way that one of the rotating bodies is located diagonally above an other rotating body, the rotating bodies rotate in conjunction with each other to convey the coin upward from a lower side in such a way that, in response to rotation of one of the rotating bodies, the pushing bodies thereof push the coin upward from the lower side to transfer the coin to a next rack rotating body, wherein the pushing bodies each have: a pin that comes into contact with the coin; and a support protrusion that supports the pin, the pin has: a large diameter portion that comes into contact with the coin; and a small diameter portion that is fitted into a pin hole provided in each of the rotating bodies, the support protrusion is disposed at an edge of a support surface of each of the rotating bodies, on which to support the coin, in such a way that the support protrusion protrudes from the support surface, the support protrusion includes, on front and rear sides thereof in a rotation direction of the rotating body, concave portions each having a shape corresponding to a circumferential surface of the large diameter portion, and the pin hole is placed away from a wall surface of each of the concave portions, the circumferential surface of the large diameter portion of the pin partially comes into contact with each of the concave portions, a step portion between the large diameter portion and the small diameter portion of the pin comes into contact with the support surface, and the small diameter portion of the pin is pivotally fitted into the pin hole, the rotating bodies each have a plurality of gear teeth arranged along an outer circumferential surface of the respective rotating bodies, the gear teeth being configured to mesh with gear teeth of adjacent rotating bodies so as to transmit rotational motion, and the pin holes are formed in each of the rotating bodies such that they are each aligned, in a radial direction from a center of the respective rotating body, with a gear tooth of the plurality of gear teeth.

2. The coin hopper according to claim 1, wherein the pin has: an inclination portion that is reduced in diameter toward a distal end of the small diameter portion; and a lock concave portion that is a ring-shaped dent located in a circumferential surface of the small diameter portion, the pin hole includes a lock convex portion on an inner circumference thereof at a position corresponding to the lock concave portion, and the pin is pivotally locked in the pin hole in such a way that the lock convex portion is latched with the lock concave portion.

3. The coin hopper according to claim 1, wherein the conveyer has the rotating bodies rotating clockwise and the rotating bodies rotating counterclockwise that are arranged alternately, and the pin hole is disposed at each of front and rear sides of the support protrusion in the rotation direction and, according to the rotation direction of each of the rotating bodies, the pin is disposed in at least one of the pin holes located at front and rear sides of the support protrusion in the rotation direction.

4. The coin hopper according to claim 3, wherein the pin is fitted into each of the pin holes arranged at front and rear sides of the support protrusion in the rotation direction.

5. The coin hopper according to claim 1, wherein the conveyer has a curved portion that curves in a conveyance direction of the coin, at least one of the rotating bodies located on front and rear sides of the curved portion in the conveyance direction is disposed in an inclined state, and the pushing bodies of the rotating bodies arranged at the curved portion have an amount of protrusion of the pin from the support surface larger than that of the rotating bodies arranged at a position other than the curved portion.

6. A coin conveyance device, comprising:

a conveyer that receives a coin one by one and conveys the received coin to an outlet port disposed above a location where the conveyer has received the coin, in which the conveyer has a plurality of rotating bodies each including pushing bodies that are arranged opposed to each other about a rotational shaft and configured to push the coin, adjacent rotating bodies are arranged in a direction from low to high alternately in such a way that one of the rotating bodies is located diagonally above an other rotating body, the rotating bodies rotate in conjunction with each other to convey the coin upward from a lower side in such a way that, in response to rotation of one of the rotating bodies, the pushing bodies thereof push the coin upward from the lower side to transfer the coin to a next rack rotating body, wherein the pushing bodies each have: a pin that comes into contact with the coin; and a support protrusion that supports the pin, the pin has: a large diameter portion that comes into contact with the coin; and a small diameter portion that is fitted into a pin hole provided in each of the rotating bodies, the support protrusion is disposed at an edge of a support surface of each of the rotating bodies, on which to support the coin, in such a way that the support protrusion protrudes from the support surface, the support protrusion includes, on front and rear sides thereof in a rotation direction of the rotating body, concave portions each having a shape corresponding to a circumferential surface of the large diameter portion, and the pin hole is placed away from a wall surface of each of the concave portions, the circumferential surface of the large diameter portion of the pin partially comes into contact with each of the concave portions, a step portion between the large diameter portion and the small diameter portion of the pin comes into contact with the support surface, and the small diameter portion of the pin is pivotally fitted into the pin hole, the rotating bodies each have a plurality of gear teeth arranged along an outer circumferential surface of the respective rotating bodies, the gear teeth being configured to mesh with gear teeth of adjacent rotating bodies so as to transmit rotational motion, and the pin holes are formed in each of the rotating bodies such that they are each aligned, in a radial direction from a center of the respective rotating body, with a gear tooth of the plurality of gear teeth.

7. The coin hopper according to claim 1, wherein the pin is supported at the side surface of the large diameter portion by an arc-shaped concave portion of the support protrusion.

8. The coin conveyance device according to claim 6, wherein the pin is supported at the side surface of the large diameter portion by an arc-shaped concave portion of the support protrusion.

* * * * *